(12) United States Patent
Miller

(10) Patent No.: US 7,055,330 B2
(45) Date of Patent: Jun. 6, 2006

(54) APPARATUS FOR DRIVING AN ACCESSORY GEARBOX IN A GAS TURBINE ENGINE

(75) Inventor: Guy Wallace Miller, Gilford, NH (US)

(73) Assignee: United Technologies Corp, Hartford, CT (US)

( * ) Notice: Subject to any disclaimer, the term of this patent is extended or adjusted under 35 U.S.C. 154(b) by 210 days.

(21) Appl. No.: 10/784,927

(22) Filed: Feb. 25, 2004

(65) Prior Publication Data

US 2005/0183423 A1 Aug. 25, 2005

(51) Int. Cl.
*F02C 7/32* (2006.01)
(52) U.S. Cl. .................. 60/792; 60/802; 74/DIG. 5
(58) Field of Classification Search ................ 60/792, 60/793, 802; 74/DIG. 5
See application file for complete search history.

(56) References Cited

U.S. PATENT DOCUMENTS 2,978,869 A * 4/1961 Hiscock et al. ............... 60/802
5,687,561 A * 11/1997 Newton ....................... 60/802
6,735,954 B1 * 5/2004 MacFarlane et al. .......... 60/793

* cited by examiner

*Primary Examiner*—Louis J. Casaregola
(74) *Attorney, Agent, or Firm*—William W. Jones

(57) ABSTRACT

A mechanical drive system for an accessory gearbox of a gas turbine engine is provided. The gas turbine engine includes a high-pressure drive shaft and a low-pressure drive shaft. The mechanical drive system includes a tower shaft and a lay shaft. The tower shaft is connected by a first gear arrangement to the low-pressure drive shaft of the gas turbine engine. The lay shaft is connected by a second gear arrangement to the first tower shaft, and connected to the accessory gearbox.

7 Claims, 3 Drawing Sheets

APPARATUS FOR DRIVING AN ACCESSORY GEARBOX IN A GAS TURBINE ENGINE

BACKGROUND OF THE INVENTION

1. Technical Field

The present invention relates to gas turbine engines in general, and to apparatus for driving an accessory gearbox in particular.

2. Background Information

Aircraft powered by gas turbine engines very often include a mechanically driven accessory gearbox for driving accessory systems such as fuel pumps, scavenge pumps, electrical generators, hydraulic pumps, etc. The power requirements of the accessory gearbox continue to increase as the number of electrical systems within the aircraft increase. Historically, the accessory gearbox has been driven by a mechanical system connected to the drive shaft (i.e., the "high pressure drive shaft") extending between the high-pressure turbine and the high-pressure compressor of the gas turbine engine. The ability to tap power off of the high-pressure drive shaft is limited, however. What is needed is an apparatus for mechanically driving an accessory gearbox that can accommodate the higher power requirements of modern aircraft.

DISCLOSURE OF THE INVENTION

According to the present invention, a mechanical drive system for an accessory gearbox of a gas turbine engine is provided. The gas turbine engine includes a high-pressure drive shaft and a low-pressure drive shaft. The mechanical drive system includes a tower shaft and a lay shaft. The tower shaft is connected by a first gear arrangement to the low-pressure drive shaft of the gas turbine engine. The lay shaft is connected by a second gear arrangement to the first tower shaft, and connected to the accessory gearbox.

One of the advantages of the present invention mechanical drive system for an accessory gearbox is that it provides increased versatility and capability over prior art mechanical drive systems that utilize a tower shaft engaged with the high pressure drive shaft. For example, in some applications it is possible to draw more power off of the low-pressure shaft than the high-pressure shaft without materially affecting the performance of the engine.

These and other objects, features and advantages of the present invention will become apparent in light of the detailed description of the present invention.

DETAILED DESCRIPTION OF THE INVENTION

Figure 1:
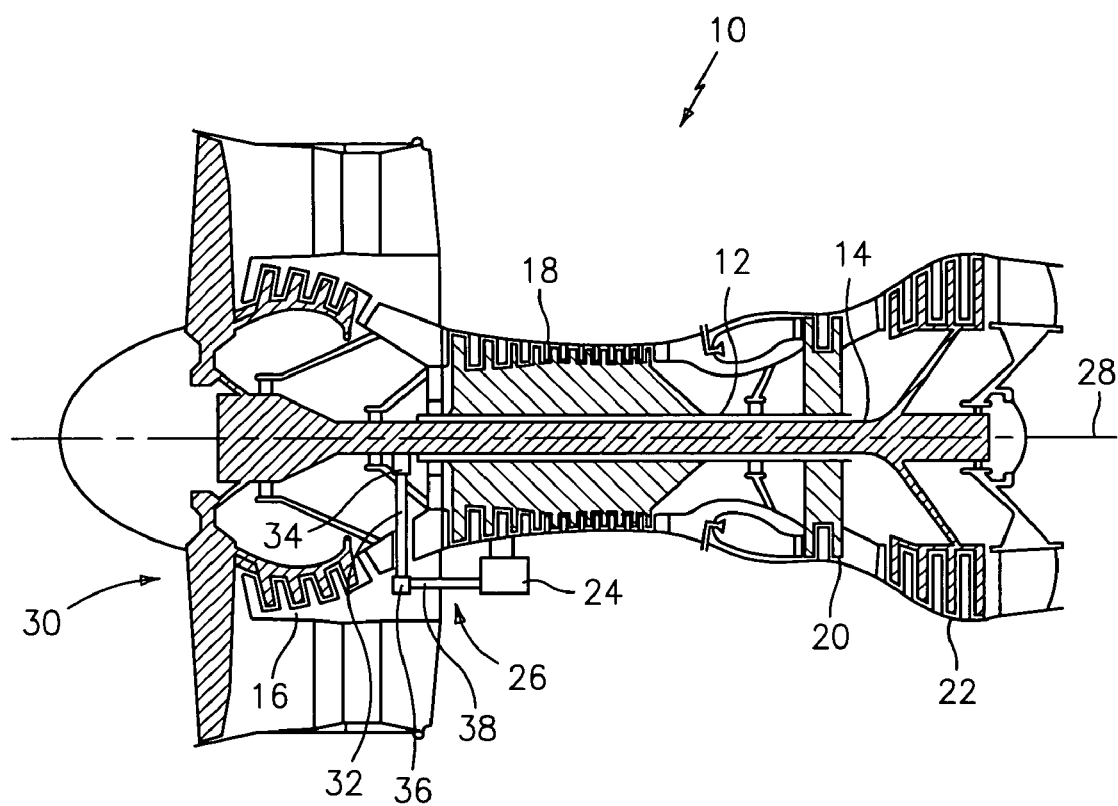
FIG. 1 is a diagrammatic view of a gas turbine engine.

Referring to FIG. 1, a gas turbine engine 10 is diagrammatically shown. The engine 10 includes a high-pressure drive shaft 12, a low-pressure drive shaft 14, a low-pressure compressor 16, a high-pressure compressor 18, a high-pressure turbine 20, a low-pressure turbine 22, an accessory gearbox 24, and a mechanical drive system 26 for the accessory gearbox 24. The drive shafts 12, 14, compressor sections 16, 18, and turbine sections 20,22 are centered about an axially extending engine centerline 28.

The low-pressure compressor 16 is disposed axially forward of the high-pressure compressor 18, and the high pressure turbine 20 is positioned forward of the low-pressure turbine 22. The terms "forward" and "aft" are used to indicate position along the axially extending engine centerline 28. A first component "forward" of a second component is positioned closer to the inlet 30 of the engine 10. The second component is positioned "aft" of the first component. In most instances, gas flow traveling through the core of the engine 10 encounters the forward component before it encounters the aft component. The low-pressure and high-pressure compressor sections 16, 18 and the high and low pressure turbine sections 20,22 each includes a plurality of stator and rotor stages.

The high-pressure drive shaft 12 is connected to and extends between the high-pressure compressor 18 and the high-pressure turbine 20. The low-pressure drive shaft 14 is connected to and extends between the low-pressure compressor 16 and the low-pressure turbine 22. The high-pressure drive shaft 12 and the low-pressure drive shaft 14 rotate about the axially extending engine centerline 28. The drive shafts 12, 14 are diagrammatically shown in FIG. 1 as concentric cylinders to simply illustrate the relationship between the components. Most low pressure and high pressure drive shafts 12, 14 are concentric, but have relatively complex geometries to accommodate all of the various components attached or disposed adjacent the drive shafts 12, 14. The portions of the drive shafts 12, 14 shown in FIGS. 2 and 3 are illustrated with geometries more typical of those actually used within gas turbine engines.

Figure 3:
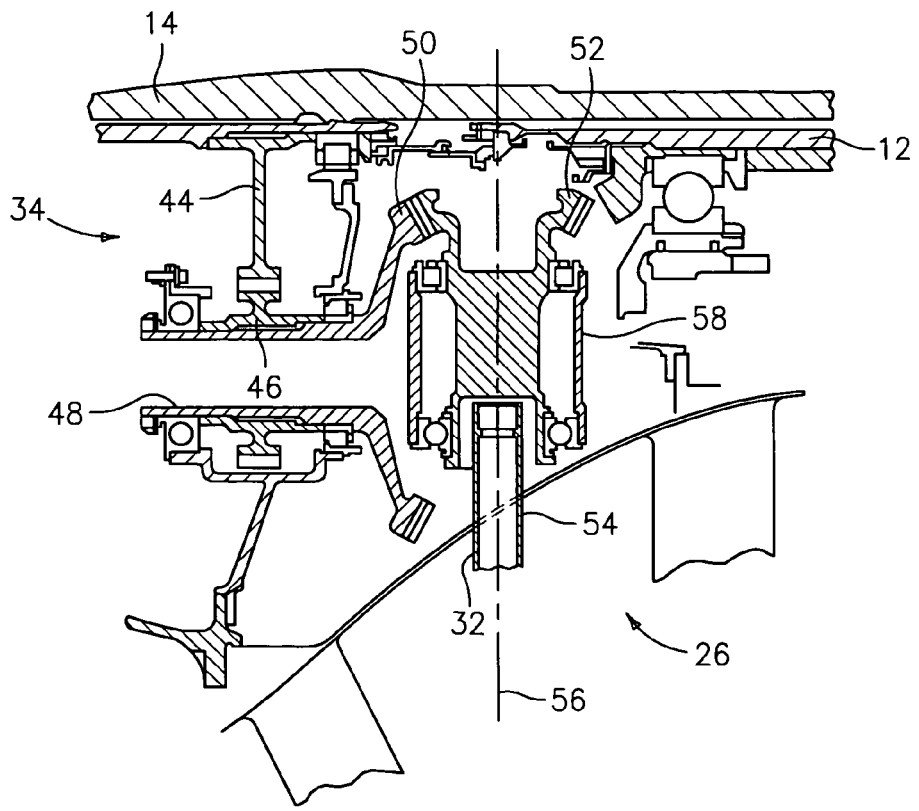
FIG. 3 is a diagrammatic sectional view illustrating an embodiment of the low-pressure drive shaft gear arrangement.
Figure 2:
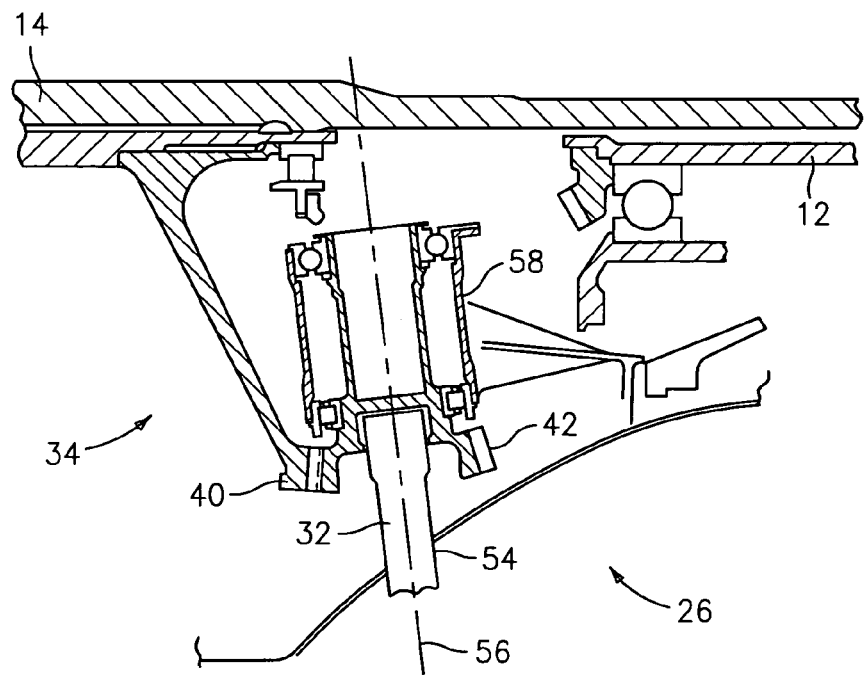
FIG. 2 is a diagrammatic sectional view illustrating an embodiment of the low-pressure drive shaft gear arrangement.

Referring to FIGS. 1–3, the mechanical drive system 26 for the accessory gearbox 24 includes a tower shaft 32, a low-pressure drive shaft gear arrangement 34 ("LPDS gear arrangement"), an angle gear arrangement 36, and a lay shaft 38. The LPDS gear arrangement 34 can assume a variety of embodiments. In a first embodiment (see FIG. 2), the LPDS gear arrangement 34 includes a first bevel gear 40 and a second bevel gear 42. The first bevel gear 40 is fixed (e.g., by one or more splines) to the low speed drive shaft 14. The first bevel gear 40 includes a plurality of gear teeth oriented to engage the second bevel gear 42. The second bevel gear 42 is fixed to the tower shaft 32.

In a second embodiment (see FIG. 3), the LPDS gear arrangement 34 includes a first spur gear 44, a second spur gear 46, an intermediate shaft 48, a first bevel gear 50, and a second bevel gear 52. The first spur gear 44 is fixed (e.g., by one or more splines) to the low speed drive shaft 14. The first spur gear 44 includes a plurality of gear teeth oriented to engage the second spur gear 46. The second spur gear 46 and the first bevel gear 50 are attached to the intermediate shaft 48. The second spur gear 46 is aligned and engaged with the first spur gear 44. The first bevel gear 50 includes a plurality of gear teeth oriented to engage the second bevel gear 52, which is fixed to the tower shaft 32.

The tower shaft 32 has a body 54 that is rotatable about a lengthwise extending axis 56. The tower shaft 32 may be a unitary shaft or it may include multiple sections connected together (e.g., by splines, etc.). The tower shaft 32 is typically oriented perpendicular to, or at a slight angle from, the engine centerline 28. In some embodiments, the tower shaft 32 includes one or more bearing mounts 58 to positionally locate the tower shaft 32 and to facilitate rotation of the tower shaft 32. As indicated above, the second bevel gear 52 is fixed to one end of the tower shaft 32.

Figure 4:
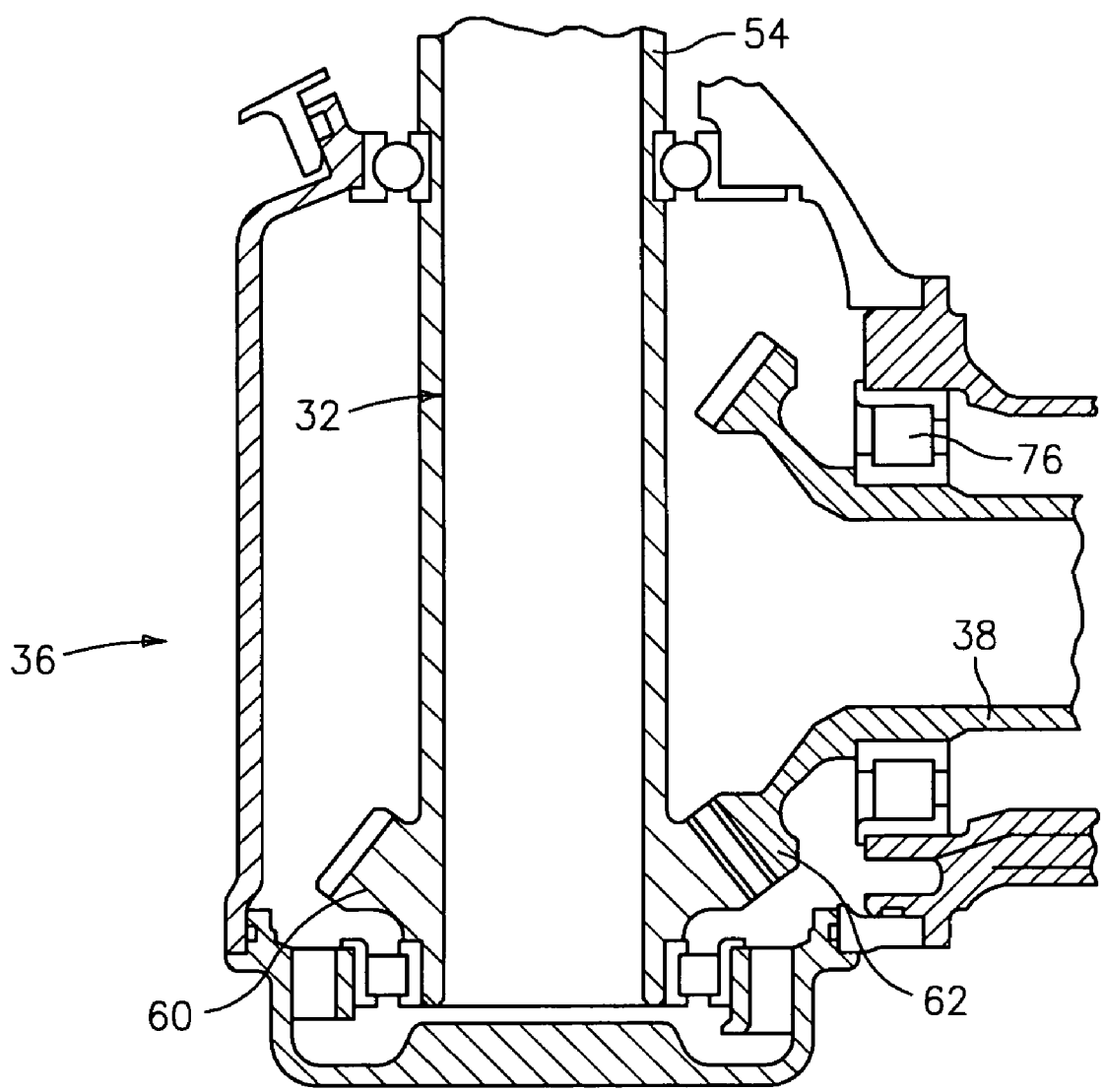
FIG. 4 is a diagrammatic sectional view illustrating an embodiment of the angle gear arrangement.

Referring to FIG. 4, the angle gear arrangement 36 can assume a variety of embodiments. In one embodiment, the angle gear arrangement 36 includes a first bevel gear 60 and a second bevel gear 62. The first bevel gear 60 is attached to the tower shaft 32, and the second bevel gear 62 is attached to the lay shaft 38. The lay shaft 38 is rotatable about a lengthwise extending axis and is typically oriented approximately perpendicular to the tower shaft axis of rotation 56. In some embodiments, the lay shaft 38 includes one or more bearing mounts 76 to positionally locate the lay shaft 38 and to facilitate rotation of the lay shaft 38. As indicated above, the second bevel gear 62 is fixed to one end of the lay shaft 38. A coupling (not shown) is attached to, or formed with, the other end of the lay shaft 38, for connecting the lay shaft 38 to the accessory gearbox 24.

In the operation of the engine, rotation of the low-pressure drive shaft 14 drives the LPDS gear arrangement 34, causing the LPDS gear arrangement 34 to rotate. The LPDS gear arrangement 34, in turn, drives the tower shaft 32, causing the tower shaft 32 to rotate about its axis 56. The tower shaft 32, in turn drives the angle gear arrangement 36, causing the angle gear arrangement 36 to rotate. The angle gear arrangement 36, in turn, drives the lay shaft 38, causing the lay shaft 38 to rotate. The lay shaft 38, coupled to the accessory gearbox 24, drives the accessory gearbox 24.

Although this invention has been shown and described with respect to the detailed embodiments thereof, it will be understood by those skilled in the art that various changes in form and detail thereof may be made without departing from the spirit and the scope of the invention.

What is claimed is:

1. A mechanical drive system for an accessory gearbox of a gas turbine engine, which engine has a low pressure drive shaft extending between and connected to a low pressure compressor and a low pressure turbine, the drive system comprising:
   a tower shaft connected by a first gear arrangement to the low pressure drive shaft; and
   a lay shaft connected by a second gear arrangement to the tower shaft, and connected to the accessory gearbox; and
   wherein the first gear arrangement includes a first gear, a second gear, a third gear, a fourth gear, and an intermediate shaft;
   wherein the first gear is attached to the low pressure drive shaft, the second gear and the third gears are attached to the intermediate shaft, and the fourth gear is attached to the tower shaft;
   wherein the first gear is engaged with the second gear, and the third gear is engaged with the fourth gear.

2. The mechanical drive system of claim 1, wherein the first gear and the second gear are mating spur gears.

3. The mechanical drive system of claim 1, wherein the third gear and the fourth gear are mating bevel gears.

4. The mechanical drive system of claim 1, wherein the second gear arrangement includes a fifth gear and a sixth gear engaged with one another, wherein the fifth gear is attached to the tower shaft and the sixth gear is attached to the lay shaft, shaft; and connected to the accessory gearbox.

5. The mechanical drive system of claim 4, wherein the fifth gear and the sixth gear are mating bevel gears.

6. A gas turbine engine, comprising:
   a high pressure drive shaft connected to and extending between a high pressure compressor and a high pressure turbine;
   a low pressure drive shaft connected to and extending between a low pressure compressor and a low pressure turbine;
   wherein the high pressure drive shaft and the low pressure drive shaft rotate about an axially extending engine centerline;
   an accessory gear box;
   a tower shaft connected by a first gear arrangement to the low pressure drive shaft; and
   a lay shaft connected by a second gear arrangement to the tower shaft, and connected to the accessory gearbox; and
   wherein the first gear arrangement includes a first gear, a second gear, a third gear, a fourth gear, and an intermediate shaft;
   wherein the first gear is attached to the low pressure drive shaft, the second gear and the third gears are attached to the intermediate shaft, and the fourth gear is attached to the tower shaft;
   wherein the first gear is engaged with the second gear, and the third gear is engaged with the fourth gear.

7. The gas turbine engine of claim 6, wherein the second gear arrangement includes a fifth gear and a sixth gear engaged with one another, wherein the fifth gear is attached to the tower shaft and the sixth gear is attached to the lay shaft.

* * * * *